United States Patent
Rolin et al.

(10) Patent No.: US 10,325,724 B2
(45) Date of Patent: Jun. 18, 2019

(54) ENERGY STORAGE SYSTEM USING RARE EARTH AND HYDROXYL CO-DOPED CERAMIC IN HUMID-ENVIRONMENT

(71) Applicant: The United States of America, as Represented by NASA, Washington, DC (US)

(72) Inventors: Terry D. Rolin, Elkmont, AL (US); Ian K. Small, Huntsville, AL (US); Curtis W. Hill, Meridianville, AL (US)

(73) Assignee: The United States of America as represented by the Administrator of NASA, Washington, DC (US)

( * ) Notice: Subject to any disclaimer, the term of this patent is extended or adjusted under 35 U.S.C. 154(b) by 47 days.

(21) Appl. No.: 15/473,364

(22) Filed: Mar. 29, 2017

(65) Prior Publication Data
US 2018/0286590 A1 Oct. 4, 2018

(51) Int. Cl.
| | |
|---|---|
| *H01G 4/30* | (2006.01) |
| *H01G 4/12* | (2006.01) |
| *C04B 35/468* | (2006.01) |
| *H01G 4/224* | (2006.01) |
| *H01G 4/005* | (2006.01) |
| *C04B 35/626* | (2006.01) |
| *H01M 6/18* | (2006.01) |
| *H01M 8/0217* | (2016.01) |

(52) U.S. Cl.
CPC ............ *H01G 4/30* (2013.01); *C04B 35/4682* (2013.01); *C04B 35/6262* (2013.01); *H01G 4/005* (2013.01); *H01G 4/1227* (2013.01); *H01G 4/224* (2013.01); *H01M 6/185* (2013.01); *H01M 8/0217* (2013.01); *C04B 2235/3201* (2013.01); *C04B 2235/3203* (2013.01); *C04B 2235/3227* (2013.01); *C04B 2235/36* (2013.01); *C04B 2235/5436* (2013.01); *C04B 2235/5445* (2013.01); *C04B 2235/5454* (2013.01); *C04B 2235/656* (2013.01); *C04B 2235/96* (2013.01)

(58) Field of Classification Search
CPC ...... H01G 4/30; H01G 4/1227; H01G 4/1218; H01G 4/1209; C04B 35/4682
USPC ................ 361/321.1, 523, 321.2, 311, 301.4
See application file for complete search history.

(56) References Cited

U.S. PATENT DOCUMENTS

| | | | |
|---|---|---|---|
| 6,202,471 B1 | 3/2001 | Yadav et al. | |
| 6,946,197 B2 | 9/2005 | Yadav et al. | |
| 2009/0091873 A1* | 4/2009 | Horiguchi | A61N 1/44 361/232 |

OTHER PUBLICATIONS

J.B. MacChesney; P.K. Gallaghar; F.V. DiMarcello, "Stablilized Barium Titanate Ceramics for Capacitor Dielectrics", May 21, 1963, Journal of the American Ceramic Society, vol. 46 No. 5, pp. 197-202.*

(Continued)

*Primary Examiner* — Eric W Thomas
*Assistant Examiner* — Arun Ramaswamy
(74) *Attorney, Agent, or Firm* — James J. McGroary; Mark P. Dvorscak

(57) ABSTRACT

An energy storage system includes a hermetically-sealed casing defining a volume whose relative humidity is a range of 30-90%. At least one energy storage capacitor disposed in the volume has a solid dielectric sandwiched between two electrodes with the solid dielectric being a lanthanum-doped barium titanate-based ceramic material.

17 Claims, 4 Drawing Sheets

(56) References Cited

OTHER PUBLICATIONS

Vijatovic et al., Properties of lanthanum doped BaTiO(3) produced from nanopowders, Ceramics International 36, 2010, pp. 1817-1824.
Ramoska et al., Dielectric investigations of La-doped barium titanate, Processing and Applications of Ceramics 4 [3], 2010, pp. 193-198.
Tsur et al., How Trivalent Amphoteric Dopants in BaTiO(3) Ceramics Improve Reliability of Capacitors, Center for Dielectric Studies, Materials Research Laboratory, The Pennsylvania State University.

\* cited by examiner

ENERGY STORAGE SYSTEM USING RARE EARTH AND HYDROXYL CO-DOPED CERAMIC IN HUMID-ENVIRONMENT

ORIGIN OF THE INVENTION

The invention described herein was made in the performance of work under a NASA contract and by an employee(s) of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected not to retain title.

CROSS-REFERENCE TO RELATED PATENT APPLICATIONS

This patent application is co-pending with one related patent application entitled "METHOD OF MANUFACTURING A HUMIDITY SENSING MATERIAL", owned by the same assignee as this patent application.

BACKGROUND OF THE INVENTION

1. Field of the Invention

This invention relates to energy storage devices. More specifically, the invention is an energy storage system having a rare earth and hydroxyl co-doped ceramic capacitance element in a hermetically-sealed humid environment.

2. Description of the Related Art

The number of small devices utilizing rechargeable energy sources is ever increasing. Many of these devices rely on state-of-the-art lithium batteries. However, in general, lithium batteries are relatively large, highly toxic, volatile, limited in terms of the number of charge/discharge cycles, limited in voltage range, and limited in terms of their charge/discharge rate.

SUMMARY OF THE INVENTION

Accordingly, it is an object of the present invention to provide an energy storage device.

Another object of the present invention is to provide an energy storage device that is rechargeable.

Still another object of the present invention is to provide an energy storage device that can be adapted for use in a variety of small devices.

Yet another object of the present invention is to provide a method of making an energy storage device.

Other objects and advantages of the present invention will become more obvious hereinafter in the specification and drawings.

In accordance with the present invention, an energy storage system includes a hermetically-sealed casing having a volume defined within the casing wherein a relative humidity in the volume is a range of 30-90%. At least one energy storage capacitor is disposed in the volume. Each energy storage capacitor has a solid dielectric sandwiched between two electrodes with the solid dielectric being a lanthanum-doped barium titanate-based ceramic material.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
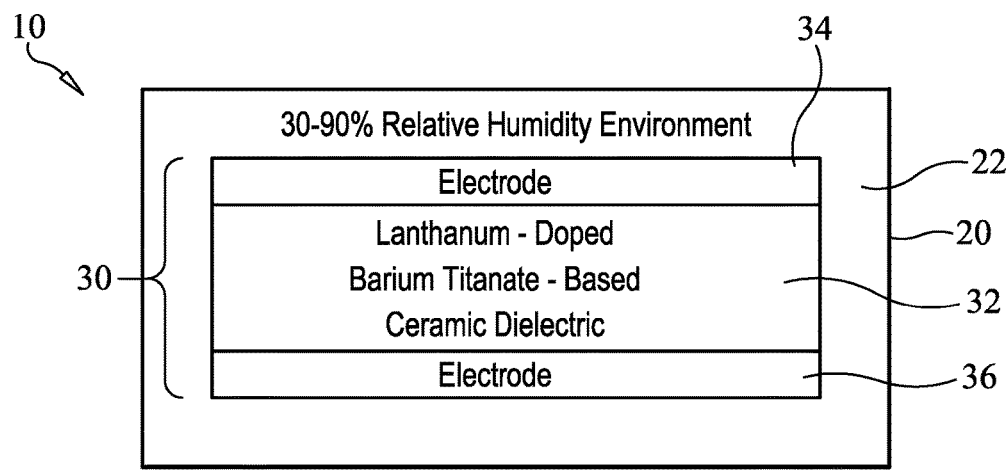
FIG. 1 is a schematic view of an energy storage system in accordance with an embodiment of the present invention.

Referring now to the drawings and more particularly to FIG. 1, an energy storage system in accordance with an embodiment of the present invention is shown and is referenced generally by numeral 10. In general, energy storage system 10 is a rechargeable system that can be incorporated into a variety of electronic devices requiring a rechargeable energy storage source. It is to be understood that the drawing of energy storage system 10 is presented to show the essential elements thereof, but is not to scale.

Energy storage system 10 includes a casing 20 and an energy storage capacitor 30 disposed within casing 20. More specifically, casing 20 is a hermetically-sealed casing that can be made from a variety of materials to include, for example, plastics, ceramics, metals, or combinations thereof. Without departing from the scope of the present invention, casing 20 can be formed about capacitor 30 or assembled with capacitor 30 being placed therein during such assembly. In either scenario, casing 20 defines an interior volume 22 in which capacitor 30 is disposed. In accordance with the present invention, volume 22 has its humidity set to a level of 30-90%. While some applications can be adequately served by a relative humidity level as low as 30%, higher levels of system performance are achieved when the relative humidity is in the range of 50-90%. Introducing a suitable level of humidity into volume 22 can be achieved, for example, by adding drops of deionized water directly to the capacitor's dielectric or to the casing's volume 22 prior to sealing casing 20. As used herein, the word "humidity" refers to an environment's relative humidity that is a percentage ratio of actual water vapor pressure to the saturation vapor pressure as is well understood in the art. The hermetically-sealed casing 20 prevents moisture from escaping into the surrounding atmosphere thereby maintaining the relative humidity level in volume 22.

Capacitor 30 includes a lanthanum-doped barium titanate-based ceramic dielectric 32 sandwiched between two electrodes 34 and 36. Dielectric 32 is a solid material whose fabrication will be described further below. Briefly, dielectric 32 includes a dopant of lanthanum hydroxide or lanthanum oxide, and an alkali hydroxide co-dopant. Suitable alkali hydroxides include potassium hydroxide, sodium hydroxide, rubidium hydroxide, and lithium hydroxide. The thickness of dielectric 32 can be in the range of 1-50 micrometers thereby assuring that capacitor 30 and energy storage system 10 can be fabricated as a small package.

Figure 2:
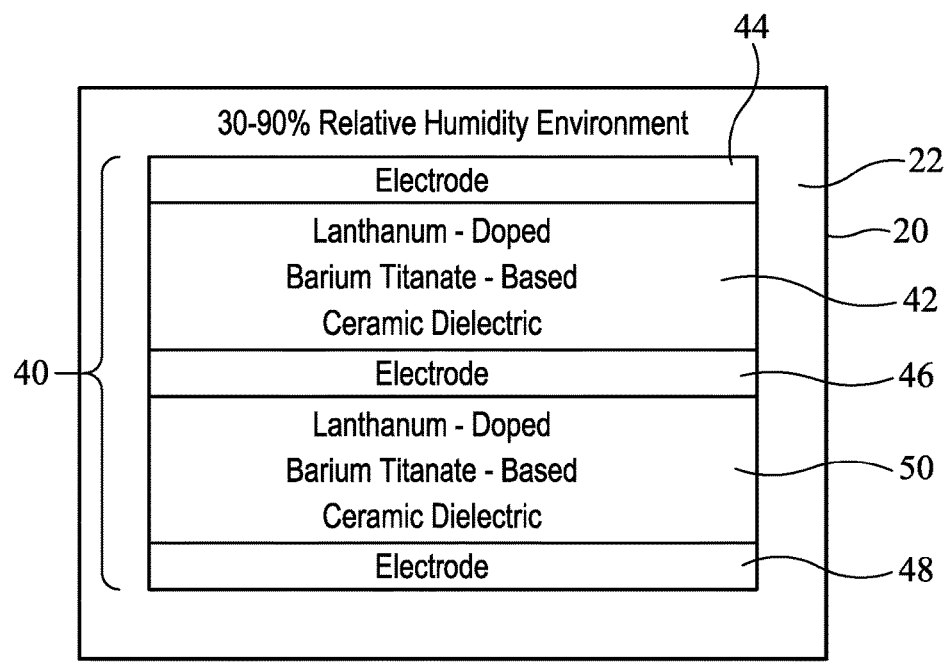
FIG. 2 is a schematic view of an energy storage system utilizing a stacked arrangement of capacitors in accordance with another embodiment of the present invention.

The present invention is not limited to the use of a single capacitor 30 in casing 20. For example and as shown in FIG. 2, a stacked arrangement 40 of capacitors can be provided in casing 20. In the illustrated example, two capacitors are created in arrangement 40, where a first capacitor is defined by electrodes 44/46 sandwiching dielectric 42 and a second capacitor is defined by electrodes 46/48 sandwiching dielectric 50. Each of dielectrics 42 and 50 is the same as dielectric 32. The electrodes can be arranged in parallel or serial configurations to either increase capacitance or voltage, respectively, depending on the needs of a particular application as would be well understood in the art.

Each individual capacitor 30, or each capacitor in stacked arrangement 40, can be fabricated in accordance with the process to be described later below. It is to be understood that the number of capacitors in a stacked arrangement can be more than two without departing from the scope of the present invention. Further, multiple individual capacitors 30 and/or multiple stacked arrangements 40 can be included in a single casing 20 without departing from the scope of the present invention. Although not illustrated, electrical leads would be coupled to the electrodes in the capacitor(s) and/or stacked arrangement(s) in accordance with the needs of a particular application as would be well understood in the art.

The present invention includes a method for making a capacitor, or stacked arrangement of capacitors, that can be readily incorporated into an energy storage system of the present invention. As mentioned above, the dielectric resulting from the method described herein is a lanthanum-doped barium titanate-based ceramic material. The process described herein for manufacturing the capacitor produces an ultra-capacitor having a very large capacitance for a single cell (e.g., capacitor 30) owing to the trivalent-doped, alkali co-doped perovskite ceramic (e.g., barium titanate, strontium titanate, etc.) used in the ceramic dielectric. The rare earth lanthanum and alkali hydroxide dopants create defects and excess electrons within the semiconducting perovskite ceramic dielectric. Oxygen vacancies within the ceramic dielectric are created by the process described later below. The resulting capacitor has a small volume and mass, but can store energy like a battery, can be charged/recharged quickly, and can withstand thousands of recharging cycles without degradation. The humid environment provided within the energy storage system's casing serves as an electrolyte that promotes electron mobility to thereby increase current carrying capacity. The energy storage system can potentially replace or be coupled with batteries in a wide variety of applications that benefit from fast charge/discharge cycling to include regenerative vehicle braking systems, cell phones, solar cell overvoltage storage, wind turbines, power grids, energy harvesting, and aerospace vehicles.

Figure 3:
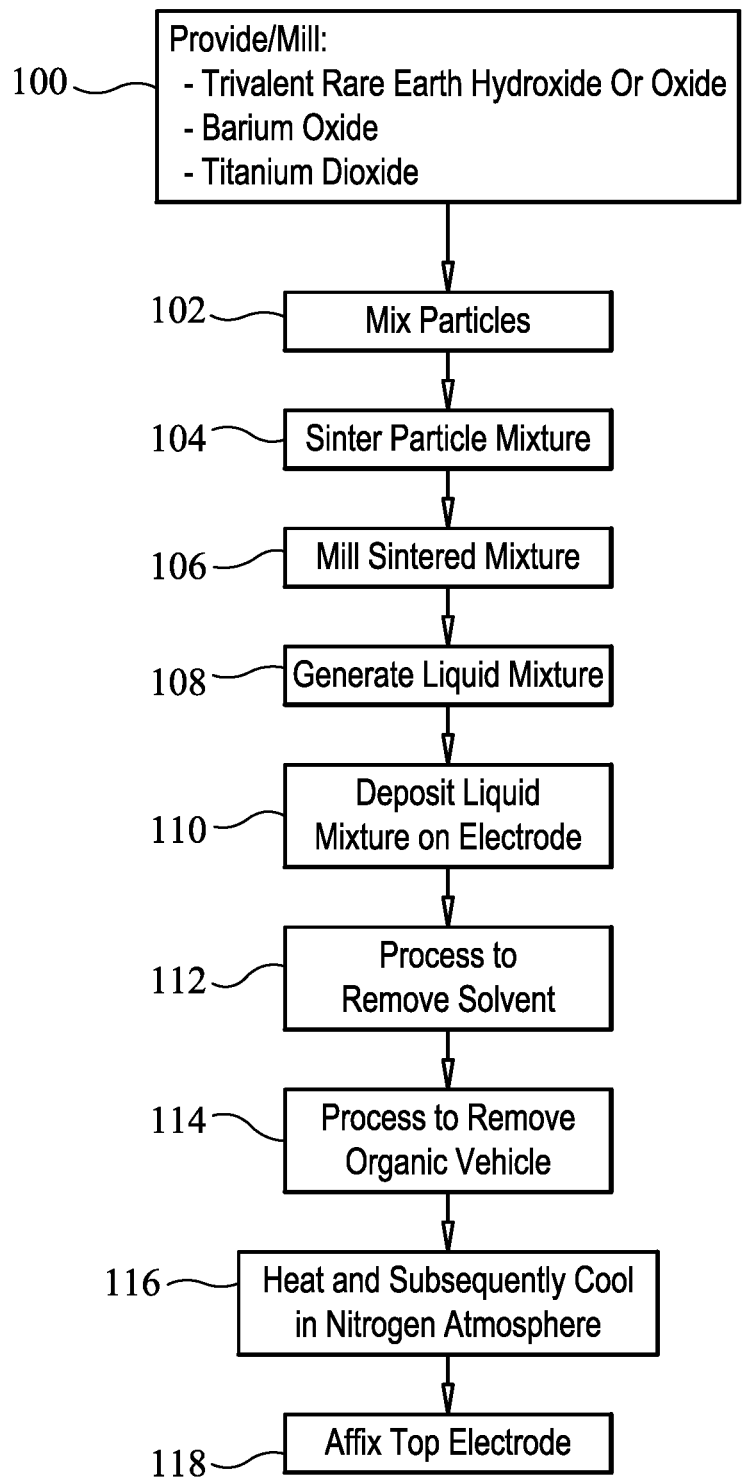
FIG. 3 is a flow diagram of a method of manufacturing an energy storage capacitor used in the energy storage system in accordance with an embodiment of the present invention.

Referring again to the drawings and more particularly to FIG. 3 a flow diagram is shown of a method for manufacturing a capacitor for the energy storage system in accordance with an embodiment of the present invention. While the method will be described relative to a specific embodiment, it is to be understood that additional embodiments are enabled by the following description. In general, the base material components used for the capacitor's dielectric include a trivalent rare earth hydroxide or oxide, barium oxide, and titanium dioxide. For the embodiment described below, the trivalent rare earth hydroxide, lanthanum hydroxide, is used.

At step 100, each of the base materials (i.e., lanthanum hydroxide, barium oxide, and titanium dioxide) is milled to provide particle forms thereof having an average grain diameter of 50-700 nanometers. It is to be understood that milling in step 100 could be omitted if the base materials were already available in the specified particle forms. At step 102, the base materials are mixed together in the following weight percent proportions:

0.7-5.0 weight percent lanthanum hydroxide,
60-65 weight percent barium oxide, and
a remaining weight percent provided by titanium dioxide.

The above-described particle mixture is heated at step 104 to a temperature in a range of 1000-1300° Celsius (C) from 4-10 hours in order to sinter the particle mixture while limiting grain growth. A heating ramp rate of approximately 5° C. per minute can be used. The resulting solid sintered base material mixture is cooled to an ambient temperature where a cooling ramp rate of approximately 5° C. per minute can be used. The resulting cooled sintered mixture is then milled at step 106 to produce milled particles having diameters of 50-700 nanometers.

The above-described sintered/milled particles are then used at step 108 to produce a liquid mixture. As will be described further below, the liquid mixture is deposited on a substrate that includes an electrode. The liquid mixture includes the following weight percent proportions:

50-70 weight percent of the above-described sintered/milled particles,
5-15 weight percent of glass particles (e.g., lead germinate, zinc borate) having particle sizes ranging from 0.5 to 10 micrometers,
0.1-5.0 weight percent of an organic surfactant such as surfactants made from phosphate esters,
5-25 weight percent of a solvent such as ester alcohol, terpineol, or butyl carbitol,
5-25 weight percent of an organic vehicle such as ethyl cellulose, and
1-5 weight percent of an alkali hydroxide such as potassium hydroxide, sodium hydroxide, rubidium hydroxide, or lithium hydroxide.

The liquid mixture from step 108 is deposited on an electrode (e.g., electrode 36) at step 110. Suitable materials for the electrode include, but are not limited to, silver palladium, silver, gold, or any other noble metal or metal alloy that is generally a low-resistance material (e.g., on the order of 1 milliohm to 10 ohms). The electrode(s) is generally affixed to an electrically non-conductive substrate to include, for example, alumina substrates, quartz glass substrates, mullite substrates, etc. The choice of material for the electrodes and substrate are not limitations of the present invention. The fixing of the electrode to a substrate material can be achieved in a variety of ways known in the art without departing from the scope of the present invention. For example, an electrode can be deposited on a substrate and the combination could undergo a sintering process to fix the electrode to the substrate.

The above-described liquid mixture on the electrode (or the "electrode-on-substrate") is next processed to achieve a desired thickness of the dielectric. A single or multiple layers of the liquid mixture could be deposited on the electrode (or electrode-on-substrate). For example, a single layer at a desired thickness can be achieved by using a screen of predetermined size. Such screens and their use are well known in the art of semiconductor "printing". The electrode (or electrode-on-substrate) and liquid layer are then dried at step 112 to remove the solvent. Multiple layer thicknesses can also be developed using a repetitive series of depositing a liquid layer on the electrode (or electrode-on-substrate) and then processing the combination to remove the solvent from the liquid layer(s). For single or multiple layer processes, solvent can be removed by heating the electrode (or electrode-on-substrate) along with any previously dried layer and current liquid layer thereon in an air environment to a temperature of 120-150° C. for a time period of 15-30 minutes. The above liquid mixture deposition and drying can be carried out as many times as needed to achieve a desired thickness for the ultimate ceramic dielectric.

The structure resulting from step 112 can be further processed at step 114 to remove the organic vehicle (e.g., ethyl cellulose) by a heating and cooling cycle. For example, the electrode (or electrode-on-substrate) and single or multiple layer dielectric material can be gradually heated to a temperature in a range of 280-350° C. A suitable gradual heating rate should not exceed 15° C. per minute. The heating temperature of 280-350° C. should be maintained for a time period of 4-72 hours to assure removal of the organic vehicle. Following this heating step, the above referenced structure is cooled to an ambient temperature. For example, cooling can be controlled to a rate of 5-10° C. per minute until the dielectric material achieves a temperature in an ambient temperature in a range of 20-25° C. As a result of processing steps 112 and 114, all liquid portions of the liquid mixture deposited in step 110 are removed yielding a solid ceramic dielectric.

The structure resulting from steps 112 and 114 is further processed at step 116 in accordance with at least one heating cycle followed by a corresponding cooling cycle. In each such heating cycle, the electrode (or electrode-on-substrate) and ceramic dielectric are heated to a temperature in a range of 850-900° C. for a time period not to exceed 15 minutes. Such heating allows the glass particles to re-flow in the layer(s) so that individual particles hold together. Following such heating, the same structure is cooled to an ambient temperature (i.e., 20-25° C.) in a nitrogen atmosphere that contains less than 25 parts per million of oxygen.

The resulting ceramic dielectric portion of the structure (e.g., dielectric 32) produced in accordance with the above-described processing steps is a lanthanum-doped barium titanate-based ceramic material. A second or top electrode (e.g., electrode 34) is affixed to the top/exposed surface of the ceramic dielectric (e.g., dielectric 32) at step 118. For example, the electrode could be deposited on the dielectric's surface and the entire structure could be heated/cooled in accordance with the heat/cool cycling procedure specified in step 116. The above-described process can be repeated multiple times to generate a stacked arrangement of the capacitors such as stacked arrangement 40.

Figure 4:
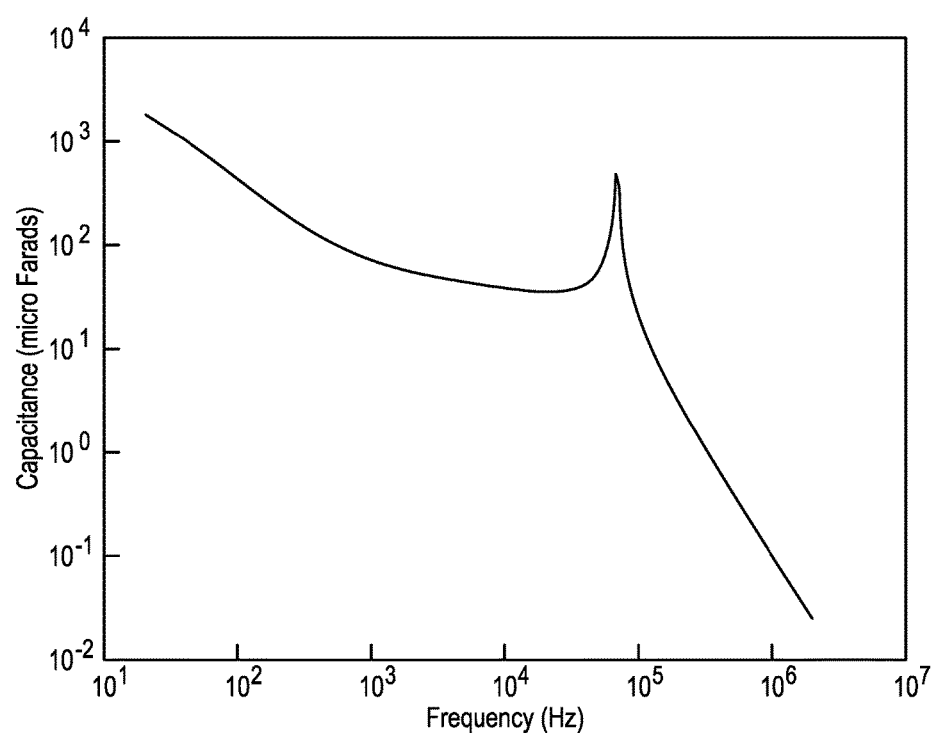
FIG. 4 is a plot of capacitance as a function of frequency for a capacitor used in an energy storage system in accordance with an embodiment of the present invention.
Figure 5:
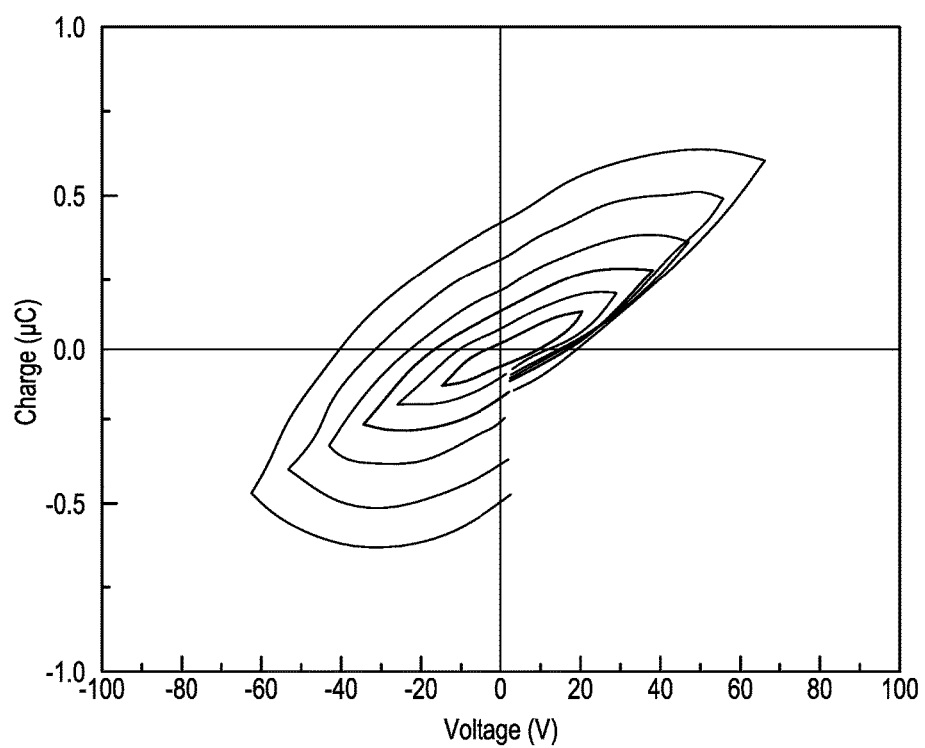
FIG. 5 is a plot of charge as a function of voltage for a capacitor used in an energy storage system in accordance with an embodiment of the present invention.

Tests of several capacitors constructed as described herein were incorporated into an energy storage system in accordance with the present invention. By way of an illustrative example, FIG. 4 illustrates capacitance versus frequency test results for a 2.5 centimeter (cm)×0.9 cm×30 micron thick single-layer dielectric device exhibiting a near DC capacitance as high as 2000 micro-Farads at 15 volts. Tests of the same device also exhibited a voltage breakdown as high as 66 volts which translates to an energy storage as high as 67 Joules/gram as shown in FIG. 5 where charge in micro-Coulombs (µC) is plotted versus voltage. Such energy storage is about one-half of that provided by a AA battery, but in a much smaller package. The above-noted tests were performed just after the energy storage system was fabricated and after the energy storage system underwent 100,000 charge/discharge cycles. It is noted that the results shown in FIGS. 4 and 5 were the same just after system fabrication and after the 100,000 charge/discharge cycles. For the exemplary dielectric material, the following proportions were used in the above-described step 102:

0.8 weight percent lanthanum hydroxide,
65 weight percent barium oxide, and
34.2 weight percent by titanium dioxide.

For the exemplary material, the following proportions were used in the above-described step 108:

61.9 weight percent of the above-described particle mixture following processing in accordance with steps 104 and 106,
6.8 weight percent of lead germinate glass particles,
1.0 weight percent of a phosphate ester organic surfactant,
14.1 weight percent of an ester alcohol solvent,
14.1 weight percent of an ethyl cellulose organic vehicle, and
2.1 weight percent of potassium hydroxide serving as the alkali hydroxide co-dopant.

The resulting ceramic dielectric was sandwiched between two silver palladium electrodes to thereby define a capacitor.

The present fabrication method can be used to fabricate other ceramic dielectric formulations. For example, another ceramic dielectric using the trivalent rare earth lanthanum hydroxide and fabricated in accordance with the present invention used the following proportions in the above-described step 102:

4 weight percent lanthanum hydroxide,
62 weight percent barium oxide, and
34 weight percent by titanium dioxide.

Still another ceramic dielectric was made using the trivalent rare earth lanthanum oxide. The material was fabricated in accordance with the present invention and used the following proportions in the above-described step 102:

0.7 weight percent lanthanum oxide,
65.1 weight percent barium oxide, and
34.2 weight percent by titanium dioxide.

The advantages of the present invention are numerous. The energy storage system provides a small-size and efficient rechargeable source of electric energy that can be adapted for use in a wide variety of powered systems or vehicles. The system is a safe alternative to volatile and highly toxic lithium batteries.

Although the invention has been described relative to specific embodiments thereof, there are numerous variations and modifications that will be readily apparent to those skilled in the art in light of the above teachings. For example, other trivalent rare earth hydroxides or oxides could be based on the rare earth elements neodymium, samarium, europium, gadolinium and dysprosium. It is therefore to be understood that, within the scope of the appended claims, the invention may be practiced other than as specifically described.

What is claimed as new and desired to be secured by Letters Patent of the United States is:

1. An energy storage system, comprising:
a hermetically-sealed casing having a volume defined within the casing wherein a relative humidity in said volume is a range of 30-90%; and
at least one energy storage capacitor disposed in said volume, each said energy storage capacitor having a solid dielectric sandwiched between two electrodes, wherein said solid dielectric is a lanthanum-doped barium titanate-based ceramic material, wherein a dopant of said lanthanum-doped barium titanate-based ceramic material is selected from the group consisting of lanthanum hydroxide and lanthanum oxide, and wherein said lanthanum-doped barium titanate-based ceramic material includes an alkali hydroxide co-dopant selected from the group consisting of potassium hydroxide, sodium hydroxide, rubidium hydroxide, and lithium hydroxide.

2. An energy storage system as in claim 1, wherein said casing is made from a material selected from the group consisting of plastics, ceramics, and metals.

3. An energy storage system as in claim 1, wherein said at least one energy storage capacitor comprises a plurality of energy storage capacitors in a stacked arrangement.

4. An energy storage system as in claim 1, wherein each said solid dielectric has a thickness in a range of 1-50 micrometers.

5. An energy storage system as in claim 1, wherein said relative humidity in said volume is a range of 50-90%.

6. An energy storage system, comprising:
a hermetically-sealed casing having a volume defined within the casing wherein a relative humidity in said volume is a range of 30-90%; and
a stacked arrangement of a plurality energy storage capacitors disposed in said volume, each of said energy storage capacitors having a solid dielectric sandwiched between two electrodes, wherein said solid dielectric is a lanthanum-doped barium titanate-based ceramic material having a thickness in a range of 1-50 micrometers, wherein a dopant of said lanthanum-doped barium titanate-based ceramic material is selected from the group consisting of lanthanum hydroxide and lanthanum oxide, and wherein said lanthanum-doped barium titanate-based ceramic material includes an alkali hydroxide co-dopant selected from the group consisting of potassium hydroxide, sodium hydroxide, rubidium hydroxide, and lithium hydroxide.

7. An energy storage system as in claim 6, wherein said casing is made from a material selected from the group consisting of plastics, ceramics, and metals.

8. An energy storage system as in claim 6, wherein said relative humidity in said volume is a range of 50-90%.

9. An energy storage system, comprising:
a hermetically-sealed casing having a volume defined within the casing wherein a relative humidity in said volume is a range of 30-90%; and
at least one energy storage capacitor disposed in said volume, each said energy storage capacitor having a solid dielectric sandwiched between two electrodes, wherein said solid dielectric is a lanthanum-doped barium titanate-based ceramic material, wherein a dopant of said lanthanum-doped barium titanate-based ceramic material comprises lanthanum hydroxide, and wherein said lanthanum-doped barium titanate-based ceramic material includes an alkali hydroxide co-dopant selected from the group consisting of potassium hydroxide, sodium hydroxide, rubidium hydroxide, and lithium hydroxide, each said energy storage capacitor prepared by a process comprising the steps of
providing particles of lanthanum hydroxide having an average grain diameter of 50-700 nanometers, particles of barium oxide having an average grain diameter of 50-700 nanometers, and particles of titanium dioxide having an average grain diameter of 50-700 nanometers,
mixing 0.7-5.0 weight percent of said particles of lanthanum hydroxide, 60-65 weight percent of said particles of barium oxide, and a remaining weight percent of said particles of titanium dioxide, wherein a mixture of particles is generated,
heating said mixture of particles to a temperature in a range of 1000–1300° C. wherein a sintered mixture is generated,
milling said sintered mixture to generate milled particles having diameters of 50-700 nanometers,
mixing 50-70 weight percent of said milled particles with
5-15 weight percent of glass particles having a particle size of 0.5-10 micrometers,
0.1-5.0 weight percent of an organic surfactant,
5-25 weight percent of a solvent,
5-25 weight percent of an organic vehicle, and
1-5 weight percent of said alkali hydroxide, wherein a liquid mixture is generated,
providing a first electrode of said two electrodes,
depositing a layer of said liquid mixture onto said first electrode,
processing said first electrode with said layer thereon to remove liquid portions of said liquid mixture, wherein said step of processing includes a cycle of heating said layer to a temperature in a range of 850-900° C. followed by a cycle of cooling said layer in a nitrogen atmosphere containing less than 25 parts per million of oxygen, and
affixing a second electrode of said two electrodes onto said layer after said liquid portions of said liquid mixture have been removed.

10. An energy storage system as in claim 9, wherein said step of heating said mixture of particles occurs in air.

11. An energy storage system as in claim 9, wherein said step of heating said mixture of particles occurs in a vacuum.

12. An energy storage system as in claim 9, wherein said layer is 1-50 micrometers in thickness.

13. An energy storage system as in claim 9, wherein said organic surfactant is selected from the group consisting of phosphate esters.

14. An energy storage system as in claim 9, wherein said solvent is selected from the group consisting of ester alcohol, terpineol, and butyl carbitol.

15. An energy storage system as in claim 9, wherein said organic vehicle comprises ethyl cellulose.

16. An energy storage system as in claim 9, wherein said glass particles are selected from the group consisting of lead germinate glass particles and zinc borate glass particles.

17. An energy storage system as in claim 9, wherein said relative humidity in said volume is a range of 50-90%.

* * * * *